US012657256B2

(12) United States Patent (10) Patent No.: US 12,657,256 B2
Bui et al. (45) Date of Patent: Jun. 16, 2026

(54) IDENTIFIER VELOCITY ANOMALY DETECTION

(71) Applicant: AT&T Intellectual Property I, L.P., Atlanta, GA (US)

(72) Inventors: Tri Bui, San Jose, CA (US); Andrew Campbell, Pleasant Hill, CA (US); Ana Armenta, San Jose, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 436 days.

(21) Appl. No.: 17/895,933

(22) Filed: Aug. 25, 2022

(65) Prior Publication Data

US 2024/0070230 A1 Feb. 29, 2024

(51) Int. Cl.
*G06F 18/2135* (2023.01)
*G06F 18/2133* (2023.01)
*G06F 18/22* (2023.01)

(52) U.S. Cl.
CPC .... *G06F 18/21355* (2023.01); *G06F 18/2133* (2023.01); *G06F 18/22* (2023.01)

(58) Field of Classification Search
USPC .................. 704/1, 9, 10, 251, 252, 257, 273
See application file for complete search history.

(56) References Cited

U.S. PATENT DOCUMENTS 11,016,997 B1 * 5/2021 Huang .................. G06F 16/285
2013/0325681 A1 * 12/2013 Somashekar ....... H04M 15/851
705/35

2019/0138652 A1 * 5/2019 Miranda ............. G06F 16/3347
2022/0100720 A1 * 3/2022 Dhama ............... G06F 18/2323
2022/0129706 A1 * 4/2022 Vivona ................. G06N 3/045
2022/0318898 A1 * 10/2022 Pei .......................... G06F 17/16
2022/0318925 A1 * 10/2022 Pei ......................... G06N 3/045
2022/0405580 A1 * 12/2022 Zheng ............... G06F 18/24147
2023/0036263 A1 * 2/2023 Martins ................. G06Q 20/42

OTHER PUBLICATIONS

Zhang, X., et al., "Character-level Convolutional Networks for Text Classification", Computer Science, Machine Learning, Sep. 4, 2015, arXiv:1509.01626, accessed from https://arxiv.org/abs/1509.01626, 9 pages.
Edizel, B., et al., "Misspelling Oblivious Word Embeddings", Computer Science, Computation and Language, May 23, 2019, arXiv:1905.09755, downloaded from https://arxiv.org/abs/1905.09755, 9 pages.
Alluin, M., "Embedding for Spelling Correction", Towards Data Science, Sep. 24, 2019, downloaded from https://towardsdatascience.com/embedding-for-spelling-correction-92c93f835d79, 9 pages.
Brownlee, J., "What Are Word Embeddings for Text?", Deep Learning for Natural Language Processing, MAchine Learning Mastery, Navigation, Aug. 7, 2019, 3 pages.
Wikipedia, "tf-idr", accessed on Jul. 12, 2022, 7 pages.
Wikipedia, "Word embedding", accessed on Jul. 12, 2022, 7 pages.

* cited by examiner

*Primary Examiner* — Leonard Saint-Cyr

(57) ABSTRACT

A processing system including at least one processor may obtain a personal identifier comprising a plurality of characters and generate a first embedding of the personal identifier in accordance with an embedding model. The processing system may then identify one or more embeddings of other personal identifiers that are within a threshold distance of the first embedding and generate an alert in response to the identifying of the one or more embeddings of the other personal identifiers that are within the threshold distance.

20 Claims, 4 Drawing Sheets

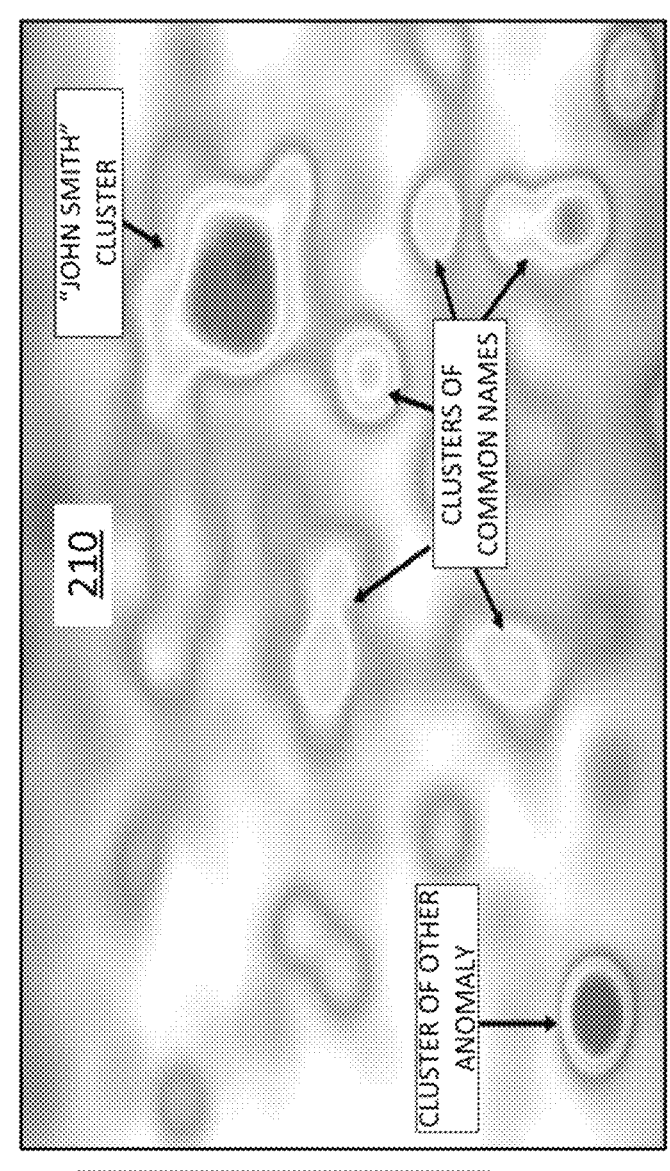
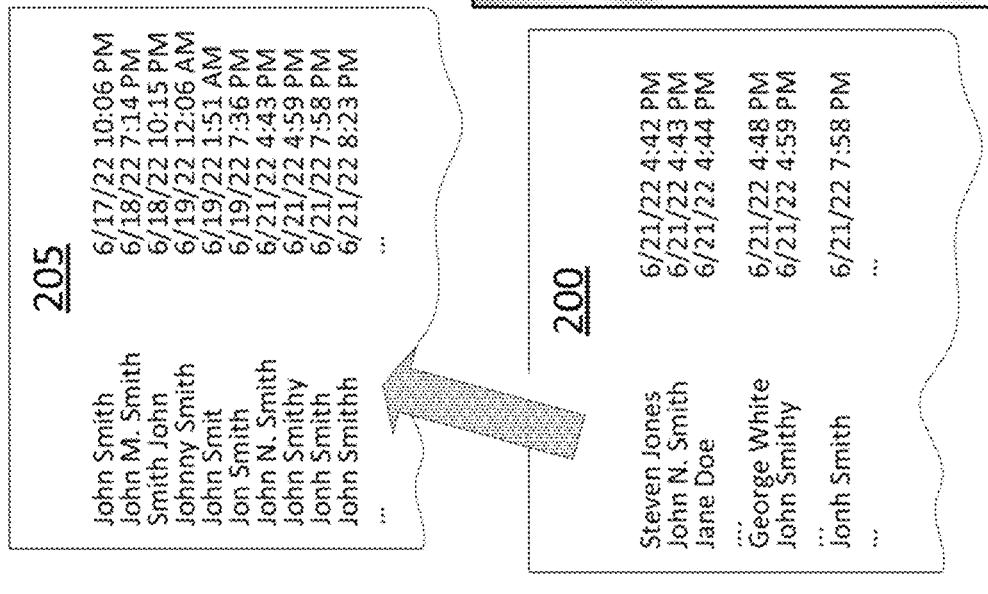
FIG. 2

Figure 3:
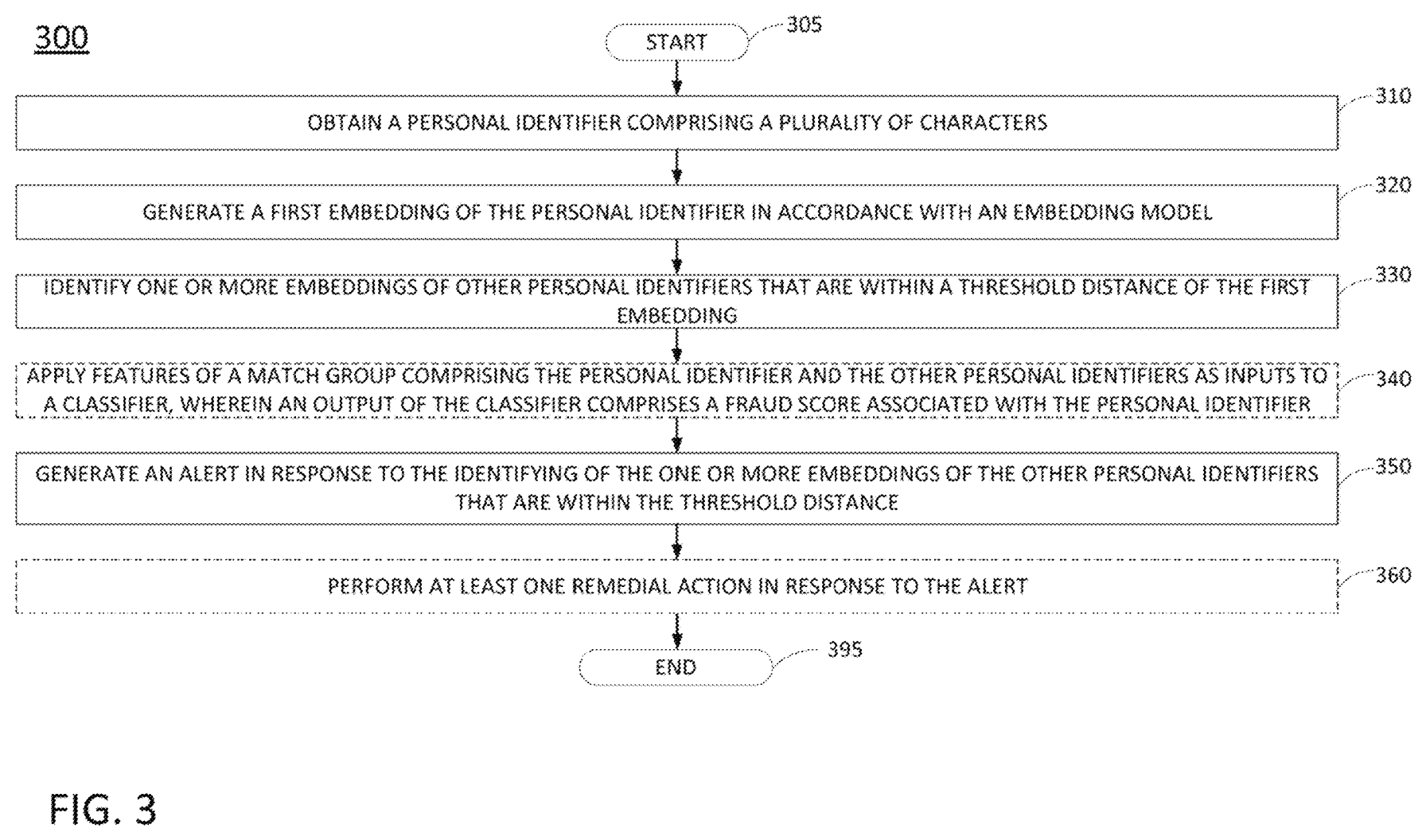

300

START — 305

OBTAIN A PERSONAL IDENTIFIER COMPRISING A PLURALITY OF CHARACTERS — 310

GENERATE A FIRST EMBEDDING OF THE PERSONAL IDENTIFIER IN ACCORDANCE WITH AN EMBEDDING MODEL — 320

IDENTIFY ONE OR MORE EMBEDDINGS OF OTHER PERSONAL IDENTIFIERS THAT ARE WITHIN A THRESHOLD DISTANCE OF THE FIRST EMBEDDING — 330

APPLY FEATURES OF A MATCH GROUP COMPRISING THE PERSONAL IDENTIFIER AND THE OTHER PERSONAL IDENTIFIERS AS INPUTS TO A CLASSIFIER, WHEREIN AN OUTPUT OF THE CLASSIFIER COMPRISES A FRAUD SCORE ASSOCIATED WITH THE PERSONAL IDENTIFIER — 340

GENERATE AN ALERT IN RESPONSE TO THE IDENTIFYING OF THE ONE OR MORE EMBEDDINGS OF THE OTHER PERSONAL IDENTIFIERS THAT ARE WITHIN THE THRESHOLD DISTANCE — 350

PERFORM AT LEAST ONE REMEDIAL ACTION IN RESPONSE TO THE ALERT — 360

END — 395

IDENTIFIER VELOCITY ANOMALY DETECTION

The present disclosure relates generally to telecommunication network operations, and more particularly to methods, computer-readable media, and apparatuses for generating an alert in response to the identifying of one or more embeddings that are within the threshold distance of an embedding of a personal identifier that is generated in accordance with an embedding model.

BRIEF DESCRIPTION OF THE DRAWINGS

The present disclosure can be readily understood by considering the following detailed description in conjunction with the accompanying drawings, in which:

FIG. 2 illustrates an example list of time-stamped personal identifiers and a corresponding visualization of an embedding space;

FIG. 3 illustrates a flowchart of an example method for generating an alert in response to the identifying of one or more embeddings that are within a threshold distance of an embedding of a personal identifier that is generated in accordance with an embedding model.

To facilitate understanding, identical reference numerals have been used, where possible, to designate identical elements that are common to the figures.

DETAILED DESCRIPTION

Figure 1:
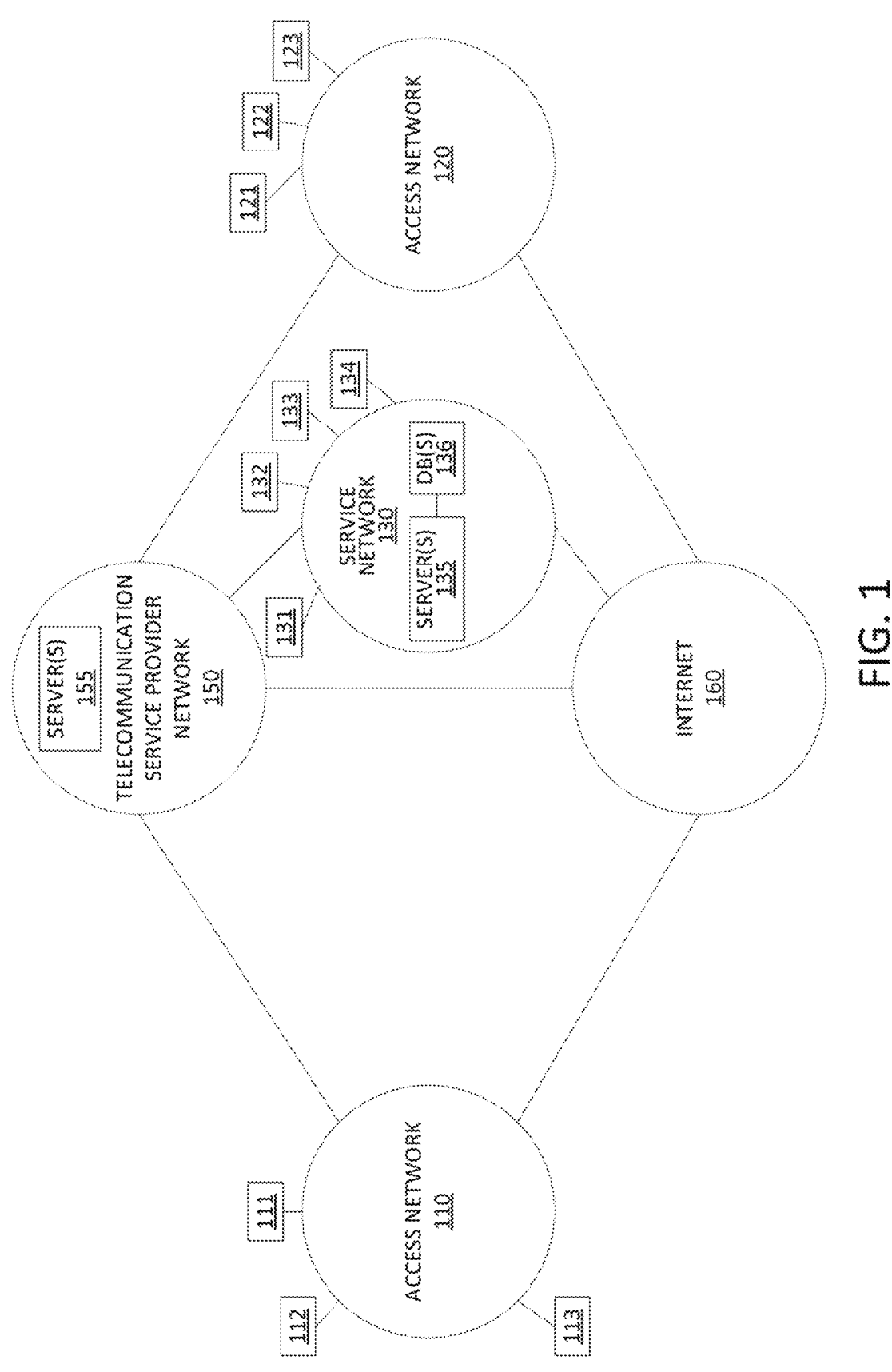
FIG. 1 illustrates one example of a system including a telecommunication network, according to the present disclosure.

The present disclosure broadly discloses methods, non-transitory (i.e., tangible or physical) computer-readable media, and apparatuses for generating an alert in response to the identifying of one or more embeddings that are within the threshold distance of an embedding of a personal identifier that is generated in accordance with an embedding model. For instance, in one example, a processing system including at least one processor may obtain a personal identifier comprising a plurality of characters and generate a first embedding of the personal identifier in accordance with an embedding model. The processing system may then identify one or more embeddings of other personal identifiers that are within a threshold distance of the first embedding and generate an alert in response to the identifying of the one or more embeddings of the other personal identifiers that are within the threshold distance.

Global e-commerce payment fraud losses have been documented to exceed tens of billion dollars annually, with a year-over-year growth trend. One aspect of such fraud may be referred to as identity spinning, which is permutating a personal identifier (such as name, social security number, street address, email, etc.) for fraudulent purposes, e.g., bypassing fraud detection systems. For example, the name John Doe may exist in a list of known fraudulent customers in the past. A same person or entity may then attempt future transactions under the name "Jonathan Doe" or "Doe Johnny."

In one example, the present disclosure may comprise a fraud detection system that uses text embeddings in order to detect anomalies in the "velocity" of certain identifiers appearing in customer or transaction data. More specifically, identifiers that have been used with high frequency in a specified timeframe may be flagged in accordance with the present examples. Notably, examples of the present disclosure may identify instances of identity spinning earlier in a transaction (and/or in a series of transactions), which may provide for substantial loss prevention (e.g., in the case where identity spinning is associated with monetary transactions, obtaining of goods and/or services, etc.). In addition, examples of the present disclosure may be applied to various personal identifier types or combinations of personal identifier types, providing for a wide range of applications in fraud detection. Notably, the present examples may use a stream of personal identifiers submitted/used in connection with subject transactions, e.g., in contrast to existing identity validation services, which may check identity against a large proprietary database.

In one example, the input(s) of the present disclosure may comprise a stream of personal identifiers from various transactions, e.g., credit applications, in-person or online retail purchase transactions, service agreement transactions, account registrations/sign-ups, and so forth. In one example, the transactions may be a same type of transaction. In another example, the personal identifiers may come from different types of transactions and may be added to the stream. In any case, the personal identifiers may be of the same type (e.g., so as to compare names to names, email addresses to email addresses, street addresses to street addresses, etc.). However, it should again be noted that examples of the present disclosure may apply to a variety of different types of personal identifiers.

For a given input personal identifier, examples of the present disclosure may output a score or value indicative of the likelihood of fraud. In one example, the score (e.g., a "fraud score") may be used to decide whether to allow or block a transaction, whether to continue to monitor a transaction, an account, or the like. In one example, for personal identifiers having a fraud score exceeding a threshold, the personal identifier may also be added to a list of known fraudulent customers, which may be further used for downstream fraud prevention via one or more automated systems, for reference by individuals who may be authorized to investigate transactions, block transactions, undo transactions, and so on.

In one example, a system of the present disclosure may comprise three components: an embedding model, anomaly detection logic, and a true positive meta-classifier. However, it should be noted that although these components may be described for illustrative purposes as distinct components, in other different examples, various functions, operations, processes, blocks, modules, or the like may have a different arrangement, such as any two or more components may be implemented as a unitary component. In one example the system accepts a personal identifier as input, and may output a fraud score for that personal identifier. To illustrate, a timeframe may be specified for a lookback window. In accordance therewith, personal identifiers (of the same type as the input personal identifier) in this timeframe may be embedded in accordance with an embedding model to produce "window embeddings." In one example, the lookback window may comprise a sliding time window containing time-stamped personal identifiers in the stream, e.g., starting from the current point in time and going back by the specified timeframe. In one example, the sliding window is updated on an ongoing basis in order to maintain a consistent timeframe. It should be noted that this lookback window may be used as a reference for identity matching in the anomaly detection stage.

In one example, the embedding model may comprise a deep learning model that represents personal identifiers as embeddings (e.g., numeric vectors) for the purpose of identity matching. In one example, each of these embeddings may comprise a point in a multidimensional space (e.g., an n-dimensional space, also referred to as an embedding space). Notably, similar personal identifiers may have similar embeddings, and therefore may be located close to each other in the embedding space. This allows for similar personal identifiers to be linked together and mapped to a single identity. To illustrate, in one example, the present disclosure may embed proper names as 90-element vectors via an embedding model. Thus, each name is represented as a vector/point in a 90-dimensional embedding space. Embedding of the names "John Doe," "Jonathan Doe," and "Doe Johnny" may therefore comprise vectors/points in close vicinity of each other, which links them together. In one example, the embedding model may take a personal identifier as input, and output an embedding (e.g., a vector representation of the personal identifier) to the anomaly detection stage.

In one example, the embedding model may comprise a text embedding model that may be used in similarity search, such as Global Vectors (GloVe) or paragraph vectors (Doc2Vec). In one example, the present disclosure may use a modified version of Doc2Vec that replaces documents and words with strings and characters, respectively. In particular, Doc2Vec was created to embed documents to discover similar documents. As such, in one example, the present disclosure may implement a version of Doc2Vec modified to apply to strings containing personal identifiers. In one example, the embedding model may have one or more tunable parameters, such as substring length and/or how far apart co-occurrences of characters are to be searched for. For instance, in one example, the present disclosure may search for co-occurrences of adjacent letters (e.g., a substring length of two and so on).

In the anomaly detection logic stage, the embedding of the input personal identifier may be compared against embeddings/vector representations of other personal identifiers within the lookback window to find matches. All matches found may form a "match group" for that input identifier. In one example, a "match" may be found when a distance between the embedding/vector representing the input personal identifier and an embedding/vector representing another personal identifier is below a threshold. The distance may be in accordance with a distance metric, such as cosine distance, Euclidean distance, a Pearson similarity/dissimilarity metric (also referred to as Pearson correlation coefficient), and so forth. As noted above, in one example, the embeddings may be conceptualized as vectors/points in a multi-dimensional embedding space. As such, in one example, the "distance" may comprise a distance between vectors/points within the embedding space. In one example, any personal identifiers associated with points/vectors within a threshold distance of the embedding of the input personal identifier may belong to the match group of the input personal identifier.

The size of this match group may represent the number of times a variation of the personal identifier appeared in the specified timeframe, e.g., the lookback window. For example, comparing the name "John Doe" to a 7-day lookback window of names may indicate how many times a variation of "John Doe" was used in the past week. Any input personal identifier with a high number of matches in the lookback window may be said to have a high velocity because it (or some variations of it) was used frequently in the specified timeframe. Thus, the size of the match group may flag an identity associated with the personal identifier that is used with high velocity. It should be noted that the "identity" may comprise a person, organization, or another entity that is assumed to be behind the use of the match group and which is submitting or otherwise utilizing the personal identifiers that are associated/matched with one another via the anomaly detection logic stage. It should be noted that a true identity of a person or another entity may not exist in the match group. Thus, for purposes of attributing a match group to a single individual or another entity, the identity may be an assigned label, e.g., a numeric value, an alphanumeric string, etc. that may distinguish one identity and one match group from other identities/match groups. In one example, the match group may be labeled with the input personal identifier.

In one example, the anomaly detection logic stage may pass a match group for the input personal identifier to the next stage, e.g., a classifier stage, which may be referred to as a "true positive meta-classifier." For instance, the classifier stage may comprise a supplementary classifier, e.g., a classifier model, to improve the system's performance in the task of identity matching. The goal of the classifier stage is to filter out false positives by incorporating more signal. In particular, in one example, the classifier stage may obtain metadata of the match group as input(s) (such as the number of matches to the personal identifier (e.g., the number of personal identifiers in the match group), the timing between entries for personal identifiers of the match group in the stream of personal identifiers, etc.). The output of the classifier stage may be a fraud score associated with the input personal identifier. Thus, the classifier stage may determine whether it is a true match group or a group of false positive matches.

The classifier model may comprise a machine learning model (MLM) or machine learning-based model, such as one or more of: a decision tree, (e.g., a decision tree classifier) (e.g., a gradient-boosted decision tree (GBDT), etc.), a naïve Bayes classifier, a random forest classifier, a support vector machine (SVM), a convolutional neural network (CNN) (e.g., a "CNN classifier"), a recurrent neural network (RNN) (e.g., an "RNN classifier"), or the like. In one example, learning/training of the classifier model may be based on a training data set comprising metadata of clusters and/or match groups of personal identifiers with labels of fraud/no fraud. These and other aspects of the present disclosure are described in greater detail below in connection with the examples of FIGS. 1-4.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or processing system, such as computing system 400 depicted in FIG. 4, and may be configured to host one or more centralized and/or distributed system components. For example, a first system component may comprise a database of assigned telephone numbers, a second system component may comprise a database of basic customer account information for all or a portion of the customers/subscribers of the telecommunication service provider network 150, a third system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, a short message service (SMS) server, a voicemail server, a video-on-demand server, a server for network traffic analysis, and so forth. It should be noted that in one example, a system component may be hosted on a single server, while in another example, a system component may be hosted on multiple servers in a same or in different data centers or the like, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user/subscriber devices.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may comprise a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth. Similarly, devices 131-134 of the service network 130 may comprise devices of network personnel responsible for operating and/or maintaining an expert search system (e.g., a processing system), personnel engaging in expert search within the organization for various purposes, and so forth.

In the example of FIG. 1, service network 130 may include one or more servers 135 which may each comprise all or a portion of a computing device or processing system, such as computing system 400, and/or a hardware processor element 402 as described in connection with FIG. 4 below, specifically configured to perform various steps, functions, and/or operations for generating an alert in response to the identifying one or more embeddings that are within the threshold distance of an embedding of a personal identifier that is generated in accordance with an embedding model, as described herein. For example, one of the server(s) 135, or a plurality of servers 135 collectively, may perform operations in connection with the example method 300 of FIG. 3, or as otherwise described herein. Similarly, one or more of the server(s) 135 may represent a fraud detection system. In other words, one or more of the server(s) 135 may provide a fraud detection service.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of examples of the present disclosure for generating an alert in response to the identifying one or more embeddings that are within the threshold distance of an embedding of a personal identifier that is generated in accordance with an embedding model. As just one example, DB(s) 136 may be configured to receive and/or store a list of time stamped personal identifiers. It should be noted that such a list may be referred to as a stream of time-stamped personal identifiers insofar as new entries may be added to the list on an ongoing basis and old entries may be removed from the list. For instance, a list 200 of time-stamped personal identifiers is illustrated in FIG. 2 and discussed in further detail below. In one example, entries in the list may be obtained from another entity. For example, one or more of the endpoint devices 111-113 and/or 121-123 may represent a server, or servers, of a consumer credit entity (e.g., a credit bureau, a credit card company, etc.), a merchant, or the like. Alternatively, or in addition, such a list may be generated by server(s) 135 from other data records stored in DB(s) 136.

For example, DB(s) 136 may be configured to receive and store records from customer, user, and/or subscriber interactions, e.g., with customer facing automated systems and/or personnel of a telecommunication network service provider (e.g., the operator of telecommunication service provider network 150). For instance, DB(s) 136 may maintain call logs and information relating to customer communications which may be handled by customer agents via one or more of the devices 131-134. For instance, the communications may comprise voice calls, online chats, text messages, emails, etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the type(s) of device(s) from which such communications are initiated, and so forth. In accordance with the present disclosure, such records may include one or more personal identifiers, such as a name provided in connection with a customer communication, the phone number(s), a street address, or IP address(es) associated with the customer communications. Alternatively, or in addition, any one or more of devices 131-134 may comprise an interactive voice response system (IVR) system, a web server providing automated customer service functions to subscribers, etc. In such case, DB(s) 136 may similarly maintain records of customer, user, and/or subscriber interactions with such automated systems. The records may be of the same or a similar nature as any records that may be stored regarding communications that are handled by a live agent.

Similarly, any one or more of devices 131-134 may comprise a device deployed at a retail location that may service live/in-person customers. In such case, the one or more of devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. It should again be noted that the records may include one or more personal identifiers such as customer-provided names, user names, phone numbers, email addresses, street addresses, governmental issued identification numbers, and so forth. In this regard, any one or more of the devices 111-113 or 121-123 may comprise a device deployed at a retail location that may service live/in-person customers and that may generate and forward customer interaction records to DB(s) 136. For instance, such a device (e.g., a "personnel device") may comprise a tablet computer in which a retail sales associate may input information regarding a customer and details of the transaction, such as identity and contact information provided by the customer (e.g., a name, phone number, email address, mailing address, etc.), desired items (e.g., physical items, such as smart phones, phone cases, routers, tablet computers, laptop computers, etc.), or service items, such as a new subscription or a subscription renewal, a type of subscription (e.g., prepaid, non-prepaid, etc.), an agreement duration (e.g., a one-year contract, a two-year contract, etc.), add-on services (such as additional data allowances, international calling plans, and so forth), discounts to be applied (such as free phone upgrades and/or subsidized phone upgrades, special group discounts, etc.), and so on. In such case, information entered and/or obtained via such personnel devices may be forwarded to server(s) 135 and/or DB(s) 136 for processing and/or storage. As such, DB(s) 136, and/or server(s) 135 in conjunction with DB(s) 136, may comprise a retail inventory management knowledge base. In addition, DB(s) 136 and/or server(s) 135 in conjunction with DB(s) 136 may comprise an account management system. For instance, information regarding subscribers' online and in-store activities may also be included in subscriber account records (e.g., in addition to contact information, payment information, information on current subscriptions, authorized users, duration of contract, etc.).

In one example, DB(s) 136 may alternatively or additionally receive and store data from one or more third parties. For example, as mentioned above, one or more of the endpoint devices 111-113 and/or 121-123 may represent a server, or servers, of a consumer credit entity (e.g., a credit bureau, a credit card company, etc.), a merchant, or the like. In such an example, DB(s) 136 may obtain one or more data sets/data feeds comprising personal identifiers. The personal identifiers may be extracted by the $3^{rd}$ party from their owner records such as: credit reports, purchasing information and/ or credit card payment information (which may include names, addresses, and/or other personal identifiers that may be provided), and so forth. Notably, in one example, DB(s) 136 and server(s) 135 do not have access to any $3^{rd}$ party proprietary data, but may obtain only a list of personal identifiers. In one example, one or more of endpoint devices 111-113 and/or 121-123 may represent a server, or servers, of an email service provider, from which DB(s) 136 may obtain email address service information (e.g., high-level information, such as the date that the email address was created and/or an age or approximate age of the email address since it was created, a mailing address and/or phone number (if any) that is associated with the email address (and if the third party is permitted to provide such information in accordance with the email address owner's permissions), and so on). Such information may then be leveraged in connection with email addresses that may be provided by customers during in-person transactions at telecommunication network service provider retail locations. Similarly, one or more of the endpoint devices 111-113 and/or 121-123 may represent a server, or servers, of one or more merchants or other entities (such as entities providing ticketed sporting events and/or concerts, email mailing lists, etc.), from which DB(s) 136 may obtain additional email address information (e.g., time-stamped email address utilization information).

In various examples, server(s) 135 may generate one or more lists of time-stamped personal identifiers from any of the above such records of any one or more record types. For instance, various records may be stored in various formats for other purposes. However, for purposes of the present disclosure, the relevant data of personal identifiers and time of use may be extracted and added to one or more lists of time-stamped personal identifiers, e.g., for further storage in DB(s) 136. It should be noted that DB(s) 136 may also store embeddings of personal identifiers that may be generated by server(s) 135. For example, embeddings may be generated and stored for each personal identifier received. In addition, each personal identifier may be stored so long as the record for the time-stamped personal identifier remains within the lookback time window. In one example, DB(s) 136 may be configured to receive and store other data that may be used to supplement or enhance the performance of examples of the present disclosure. For instance, DB(s) 136 may store a list of personal identifiers known to be associated with fraud, which may be updated from time to time via fraud detection as described herein and/or via other mechanisms. For example, when a match is found between an input personal identifier and a personal identifier known to be associated with fraud, a threshold match group size for declaring fraud/potential fraud may be reduced, e.g., from four to three, two, or even one (for instance, in one example, any match to a personal identifier known to be associated with fraud may be flagged/alerted).

In an illustrative example, server(s) 135 may obtain a personal identifier (e.g., from DB(s) 136, from server(s) 155, and so forth) and may generate a first embedding of the personal identifier in accordance with an embedding model. Server(s) 135 may then identify one or more embeddings of other personal identifiers that are within a threshold distance of the first embedding. For instance, server(s) may have previously generated embeddings of the other personal identifiers. For example, the other personal identifiers may have been received by the server(s) 135 within a lookback time window, where server(s) 135 may have generated the respective embeddings upon receipt of the respective personal identifiers. Alternatively, or in addition, the other personal identifiers may be timestamped by one or more other entities (e.g., server(s) 155, or the like) with time of use in connection with various transactions and stored in DB(s) 136. Thus, server(s) 135 may retrieve the personal identifiers from DB(s) 136 and generate the respective embeddings. As such, server(s) 135 may identify one or more embeddings of other personal identifiers that are within a threshold distance of the first embedding by calculating the respective distances in accordance with a distance metric, e.g., a cosine distance, a Euclidean distance, etc. In other words, any embeddings for which such distances are less than (or in one example less than or equal to) the threshold distance (such as a cosine distance of 0.35, 0.4, 0.42, 0.48, 0.5, etc.) may be identified. In one example, if the number of matching embeddings exceeds a threshold (e.g., four, six, seven, etc.), server(s) 135 may apply the match group (e.g., metadata thereof) as input(s) to a classifier model to identify whether the match group is a true positive (e.g., indicative of fraud) or false positive.

In addition, server(s) 135 may generate an alert in response to the identifying of the one or more embeddings of the other personal identifiers that are within the threshold distance, e.g., where the alert is indicative of fraud. For instance, the alert may be transmitted to one or more user endpoint devices of personnel of an organization that may stop an in-person or online purchase transaction or the like from completion. Alternatively, or in addition, the alert may be transmitted to one or more automated systems, such as server(s) 155, which may implement various remedial actions in response to obtaining the alert. In one example, the alert may include a fraud score that may be output by the classifier model. Further details regarding operations of server(s) 135 for generating an alert in response to the identifying of one or more embeddings that are within the threshold distance of an embedding of a personal identifier that is generated in accordance with an embedding model, are discussed below in connection with the examples of FIGS. 2 and 3.

In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like. As noted above, in one example, one or more of the servers 135 may comprise a processing system that is configured to perform operations for generating an alert in response to the identifying one or more embeddings that are within the threshold distance of an embedding of a personal identifier that is generated in accordance with an embedding model, as described herein. For instance, a flowchart of an example method 300 for generating an alert in response to the identifying one or more embeddings that are within the threshold distance of an embedding of a personal identifier that is generated in accordance with an embedding model is illustrated in FIG. 3 described in greater detail below.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. In addition, although the foregoing describes an example of an organization operating telecommunication service provider network 150, in another example, server(s) 135 and/or server(s) 135 in conjunction with DB(s) 136 may provide a fraud detection service to one or more third parties, e.g., to another organization as a network-based service. Likewise, in one example, the functions of server(s) 135 and/or DB(s) 136 may be deployed by an entity that does not provide telecommunication services. For instance, a merchant, a credit card company, etc. may operate its own fraud detection system as described herein. Thus, these and other modifications are all contemplated within the scope of the present disclosure.

FIG. 2 illustrates an example list 200 of time-stamped personal identifiers and a corresponding visualization of an embedding space 210 showing several clusters that may be related to different personal identifiers. In one example, the list 200 may include personal identifiers that may be submitted in connection with transactions of one or several transaction types (e.g., online retail, in-person retail, account access, etc.). In one example the clusters may represent different identities, such as "John Smith" and variations thereof, and so on for other identities. It should be noted that all of the names shown in FIG. 2 (or any other names mentioned in this disclosure) are not associated with real individuals and are only arbitrarily presented herein as an example. Any correlation of these arbitrary names to real individuals are purely coincidental. For instance, for common names, for any given time window/lookback period there may be well defined-clusters insofar as it may be expected to have various instances of these identities in the list 200. Sub-list 205 illustrates instances of variations of the name "John Smith" that may be found in the list 200. Thus, for example, sub-list 205 indicates that there may be at least 10 personal identifiers in the list 200 that may be mapped to "John Smith." These 10 or more personal identifiers may comprise a match group for "John Smith" and may result in a strong cluster in the embedding space 210 when these personal identifiers are embedded (e.g., represented as points/vectors in the embedding space). It should be noted that to the extent that the match group for "John Smith" may exceed a threshold number of matches, the corresponding cluster in the embedding space 210 may be considered an anomaly. For example, a person or organization of individuals may be engaging in identity spinning in connection with fraud or attempted fraud utilizing permutations off of the name "John Smith." Notably, the embedding space 210 includes a cluster for another anomaly. For instance, there may be another identity that is the subject of identity spinning at or around the same time as the identity associated with "John Smith." In any case, the clusters illustrate a close proximity (e.g., close distance) within the embedding space 210 for variations of the same name. It should be noted that for illustrative purposes the embedding space 210 of FIG. 2 is provided as a two dimensional projection, and that in other, further, and different examples, an embedding space may have a number of dimensions that exceeds reasonable visualization (e.g., 45 dimensions, 90 dimensions, etc.). In addition, it should be noted that in various examples, an actual clustering of points/vectors representing personal identifiers may be omitted. For instance, the present disclosure may embed various personal identifiers, calculate distances of these embeddings to an embedding of a subject/input personal identifier, and identify any having a distance below a threshold. For instance, the sub-list 205 may represent such a list of matching personal identifiers that may be found within the larger list 200. Thus, these and other modifications, and/or additional features, are all contemplated within the scope of the present disclosure.

FIG. 3 illustrates a flowchart of an example method 300 for generating an alert in response to the identifying one or more embeddings that are within the threshold distance of an embedding of a personal identifier that is generated in accordance with an embedding model, according to the present disclosure. In one example, the method 300 is performed by a component of the system 100 of FIG. 1, such as by server(s) 135, and/or any one or more components thereof (e.g., a processor, or processors, performing operations stored in and loaded from a memory or distributed memory system), or by server(s) 135, in conjunction with one or more other devices, such as server(s) 155, and so forth. In one example, the steps, functions, or operations of method 300 may be performed by a computing device or processing system, such as computing system 400 and/or a hardware processor element 402 as described in connection with FIG. 4 below. For instance, the computing system 400 may represent at least a portion of a platform, a server, a system, and so forth, in accordance with the present disclosure. In one example, the steps, functions, or operations of method 300 may be performed by a processing system comprising a plurality of such computing devices as represented by the computing system 400. For illustrative purposes, the method 300 is described in greater detail below in connection with an example performed by a processing system. The method 300 begins in step 305 and proceeds to step 310.

At step 310, the processing system obtains a personal identifier comprising a plurality of characters, e.g., alphanumeric characters. For instance, the personal identifier may comprise a submitted name in connection with a type of transaction. Alternatively, or in addition, the personal identifier may comprise a submitted address, a submitted username, a submitted account identifier, a submitted account verification keyword (e.g., mother's maiden name, father's middle name, name of a first pet, name of an elementary school, a street you grew up on, etc.), a submitted governmental issued identification number (e.g., a passport number, a driver's license number, a social security number, a taxpayer identification number, an employer identification number, etc.), and so forth. The type of transaction may comprise a purchase transaction, a lease transaction, a transaction to gain access (e.g., providing a name to join a mailing list or to be allowed to comment in comment sections of a website, etc.), a transaction to obtain a discount, a transaction to obtain credit, and so forth. In one example, the personal identifier may be received and time-stamped as one entry of a data set and/or a stream of time-stamped personal identifiers. In another example, the personal identifier may be obtained as part of a different type of record, where the personal identifier may be extracted therefrom. In one example, a time-stamp may also be extracted from such a record. However, in another example, the time-stamp may be added and may record a time at which the processing system receives the personal identifier (e.g., if there is no time/timestamp indicated in a source record from which the personal identifier is obtained).

At step 320, the processing system generates a first embedding of the personal identifier in accordance with an embedding model. For instance, the embedding model may comprise a text embedding model. In one example, the embedding model may comprise a character-level embedding model (which can be considered as a subset of a text and/or a word embedding model). For example, the embedding model may comprise a term frequency-inverse document frequency (tf-idf) model, a deep learning-based embedding model, such as GloVe, Word2Vec, Doc2Vec, etc. modified to apply to strings containing personal identifiers, or the like, a character-level CNN, and so forth.

In another example, the word embedding model may comprise a co-occurrence matrix model. For instance, in accordance with the present disclosure, the vocabulary of the co-occurrence matrix model may comprise characters. For example, in such case, step 320 may comprise generating a first co-occurrence matrix (e.g., the first embedding) in which elements of the co-occurrence matrix may comprise measures of co-occurrences of text characters within the personal identifier. For instance, this may comprise counts of pairs of adjacent characters. In another example, this may alternatively or additionally include pairs of characters that may be separated by one or more character spaces within the personal identifier, may alternatively or additionally comprise co-occurrences of groups of characters (e.g., a number of instances of the sub-string "qu" that are adjacent to the sub-string "av" (e.g., 4-character substrings), and so on for other 4-character substrings, 3-character sub-strings, and/or 5-character substrings, and so forth). It should be noted that the deep-learning embedding models described above may also look to character co-occurrences as relevant signal for purposes of generating the first embedding. In addition, each of these examples of an embedding model may have one or more tunable parameters, such as substring length and/or how far apart co-occurrences of letters are to be searched for. For instance, in one example, the present disclosure may search for co-occurrences of adjacent letters (e.g., substring length of two).

In one example, the first embedding may comprise a first vector representation of the personal identifier in a multidimensional space. For instance, each dimension may represent a co-occurrence of a pair of characters, and a magnitude of the first vector component in that dimension may be a count of the number of such co-occurrences within the personal identifier. In another example, the number of dimensions may be less than the number of possible co-occurrence pairs. For example, a deep learning embedding model may be trained to generate a vector with a different length (e.g., a different number of dimensions for the embedding space). In other words, the deep learning embedding model may provide for a dimensionality reduction.

At step 330 the processing system identifies one or more embeddings of other personal identifiers that are within a threshold distance of the first embedding. For instance, the one or more embeddings of the other personal identifiers may comprise one or more other vector representations of the other personal identifiers. In one example, the vector representations may comprise points in a multidimensional space (e.g., a same multidimensional space as the first embedding). For example, distances of the embeddings of the other personal identifiers to the first embedding may be calculated as one of: cosine distances between each of the one or more other vector representations and the first vector representation, Euclidean distances between each of the one or more other vector representations and the first vector representation, or the like. For instance, the distances may alternatively comprise L1 distances, Pearson similarity/dissimilarity metrics, and so forth. In one example, step 330 may comprise identifying the one or more embeddings of the other personal identifiers that are associated with a lookback time period. For instance, the lookback time period may be a defined time period prior to the obtaining/receiving of the personal identifier at step 310, e.g., 24 hours, 48 hours, one week, two weeks, etc. In one example, step 330 may comprise identifying a threshold number of the one or more embeddings of the other personal identifiers (e.g., four, five, seven, etc.) that are within the threshold distance, depending upon the particular implementation. For instance, different thresholds may be used for different types of personal identifiers, different channels via which the personal identifiers are obtained (e.g., in-person retail, online retail, comment section postings of an online news website, etc.), and so forth.

As noted above, in one example, the first embedding may comprise a co-occurrence matrix. Thus, in such an example, the one or more embeddings of other personal identifiers may also comprise co-occurrence matrices. In such case, in one example, the distances calculated at step 330 may comprise Frobenius distances, or the like. Alternatively, a co-occurrence matrix may be flattened, e.g., into a flat array, or vectorized. In other words, the matrix may be reformatted into a single row or column, for instance, and similarly for co-occurrence matrices representing other personal identifiers. As such, the processing system may alternatively calculate cosine distances, Euclidean distances, and so forth, as described above.

It should be noted that the one or more other personal identifiers may be of the same type as the personal identifier obtained at step 310 and may comprise, for example: submitted names in connection with one or more types of transactions, submitted addresses in connection with one or more types of transactions, submitted usernames in connection with one or more types of transactions, submitted account identifiers in connection with one or more types of transactions (e.g., account numbers, which may include non-numeric characters, etc.), submitted account verification keywords in connection with one or more types of transactions (e.g., mother's maiden name, father's middle name, name of first pet, name of elementary school, street you grew up on, etc.), submitted governmental issued identification numbers in connection with one or more types of transactions (e.g., passport numbers, driver's license numbers, social security numbers, taxpayer identification numbers, employer identification numbers, etc.), and so forth. In one example, the one or more embeddings of the other personal identifiers that are within the threshold distance may comprise at least one personal identifier that is flagged as being potentially fraud-associated (e.g., associated with bot-net activity, e-mail, text, or phone spam, robocalling, fraudulently obtaining equipment, etc. in a telecommunication network environment; violation of terms of use of an online social platform (e.g., social media network, comment sections of new sites, discussion boards/forums, and so forth)).

In one example, step 330 may alternatively or additionally comprise clustering the first embedding and the one or more embeddings of the other personal identifiers in accordance with a clustering algorithm. For instance, step 330 may comprise applying the clustering algorithm to the vector representations. In various examples, the clustering may comprise a k-means clustering, a DBSCAN (density-based spatial clustering of applications with noise) clustering, etc. The clustering may be based on a distance metric such as described above.

At optional step 340, the processing system may applying features of a match group comprising the personal identifier and the other personal identifiers as inputs to a classifier, where an output of the classifier comprises a fraud score associated with the personal identifier. For instance, the classifier may comprise one or more of a decision tree, (e.g., a decision tree classifier) (e.g., a gradient-boosted decision tree (GBDT), etc.), a naïve Bayes classifier, a random forest classifier, a support vector machine (SVM), a CNN (e.g., a "CNN classifier"), an RNN (e.g., an "RNN classifier"), or the like. The features of the match group may comprise, for example, a number of exact matches between the personal identifier and the other personal identifiers having embeddings within the threshold distance, a timing between submissions of personal identifiers belonging to the match group, distances between the first embedding and the one or more embeddings of other personal identifiers, distances between the one or more embeddings of other personal identifiers with each other, and so forth. For instance, fraudsters may prefer to maximize changes and maximize distance, whereas legitimate users that mistype identifiers (or have them mis-entered) may tend to have very small distances between the identifiers. In other words, the embeddings/vector representations may generally be more similar than for fraudsters. This type of nuance may be learned and detected for subsequent cases in the meta-classifier.

Similarly, it is possible that a user is entering details via an online form, and there is a problem such that the same form is submitted 20 times. For instance, it may be common for users without cookies enabled to submit a form and resubmit again with the same data because a confirmation screen is never reached. The timing of this type of activity will have a distinctive pattern close in time. In addition, it is more likely that the personal identifiers will be exact matches or only small variation because the user is trying to enter valid information. Thus, a classifier trained with labeled training data of the same nature may learn to distinguish these types of patterns as legitimate/non-fraud behavior. For instance, if the classifier may obtain match group metadata that indicates a large number of personal identifiers in the match group, but there is a high number of exact matches close in time, this may be tagged by the classifier as a false negative (e.g., the fraud score may be less than 50 out of 100 (e.g., 100 being indicative of certain fraud), less than 25, etc.).

In one example, the features may alternatively or additionally include distances between a centroid of embeddings of personal identifiers of the match group (e.g., a cluster in a multidimensional space) and centroids of one or more other clusters. For instance, a cluster of the match group and the one or more other clusters may be identified according to a clustering algorithm, such as described above in connection with step 330. In one example, multiple classifier models may be use at optional step 340, such as stacking, boosting, etc. For instance, one example may use a CNN for spatial features of cluster/match group vector representations in a multidimensional space, and use an RNN for timing of entries of personal identifiers. The fraud score that may be output at step 340 may be a value that is indicative of a likelihood of fraud and may be according to a selected scale that is implemented for the classifier, e.g., 1 to 100, 0 to 100, 1 to 10, −5 to +5, Y/N (e.g., a binary output of fraud/no fraud likely), etc.

At step 350, the processing system generates an alert in response to the identifying of the one or more embeddings of the other personal identifiers that are within the threshold distance. For instance, the alert may be generated and provided to one or more responsible individuals, one or more other automated systems, and so forth. For example, the alert may be provided to another system that may be processing a credit card transaction. The alert may therefore permit the other system to stop/present the transaction from completing, may permit the other system to engage in additional identity and/or authorization verification steps, and so forth. Similarly, the alert may be provided to store personnel for an in-person retail transaction so as to permit the personnel to stop a transaction, to permit the personnel to engage in additional identity and/or authorization verification steps, and so forth. In one example, the alert may be generated further in response to the fraud score that may be output at optional step 340 (e.g., if the fraud score exceeds a threshold, e.g., 75% if scaled on 0 to 100%, or the like, or if the fraud score is Y (for a binary output of fraud/no fraud, or Y/N), if the fraud score is a 4 or a 5 on a scale of 1-5 of the possible outputs of the classifier, etc., depending upon the particular implementation and/or configuration of the classifier (e.g., tunable parameters thereof)).

At optional step 360, the processing system may perform at least one remedial action in response to the alert (e.g., at least in part in response to the alert and/or the fraud score contained in the alert; for instance, the fraud score may be combined with other fraud scores, may be input to other fraud detection module(s) as another input, and so forth). The at least one remedial action may comprise, for example, locking or blocking access to a subscriber account, preventing user name changes for an account, sending a code for two-factor authentication, sending a text message or email alerting an account owner of suspicious activity indicative of spoofing, account takeover or compromise, attempted identity theft, or the like, imposing increasing inter-call time gaps, preventing a new registration, e.g., for a new social media account, for obtaining access/permission to post to an online message forum, etc., stopping a credit card or similar purchase transaction (either online or in-person), and so on.

Following step 350 or optional step 360, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 310-350 or step

310-360 for additional personal identifiers, and so forth. In one example, the method 300 may further include adding the first embedding that is generated at step 320 to a set, or list of embeddings. For instance, the one or more embeddings of the other personal identifiers that are identified at step 330 may be contained in such a list/set of embeddings. In addition, the set of embeddings may be updated on an ongoing basis as new personal identifiers may be obtained (e.g., in a stream of personal identifiers that may be processed via the steps of the method 300). In another example, the embeddings may be generated in batches, e.g., when a certain number of new personal identifiers has been received and/or after a passage of time, e.g., every five minutes, every 10 minutes, etc.

In one example, optional step 340 may follow step 350. For instance, the applying of the features to the classifier may be performed in response to the alert. In one example, the method 300 may further comprise presenting the fraud score (e.g., transmitting the fraud score to one or more entities (e.g. human end users and/or automated systems), presenting the fraud score via a display screen of a user endpoint device, etc.). As noted above, the fraud score can be used as an input to an ensemble detection model that is based on ensemble learning, e.g., combining different fraud scores from different fraud models relating to the personal identifier or other factors of a transaction to decide whether a transaction is to be permitted or denied, whether a transaction is to be continued to be monitored (e.g., with escalated scrutiny/analysis as compared to other transactions that are not flagged, etc.), or the like. For instance, a fraud score obtained via the method 300 may be combined with fraud scores or other fraud indicators from other mechanisms. To illustrate, for transactions via an online channel, other mechanisms may look at IP addresses of form submissions, user agent features, e.g., browser software, screen size/resolution, etc. For retail transactions, other fraud detection mechanisms may look at distances between stores, cell phone and attempted credit card usage co-location information, a number of types of transactions attempted at a single visit (e.g., change mailing address, obtain a new phone, upgrade service level), and so on.

In one example, a personal identifier may comprise a combination of fields, such as a name plus address, where minor variations the name and/or the address may map to a same identity. In another example, the method 300 may include performing steps 310-340 or the like in parallel, or two or more times sequentially for the different types of personal identifiers. In such case, two or more fraud scores may be calculated and combined to provide an overall/composite fraud score. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 4:
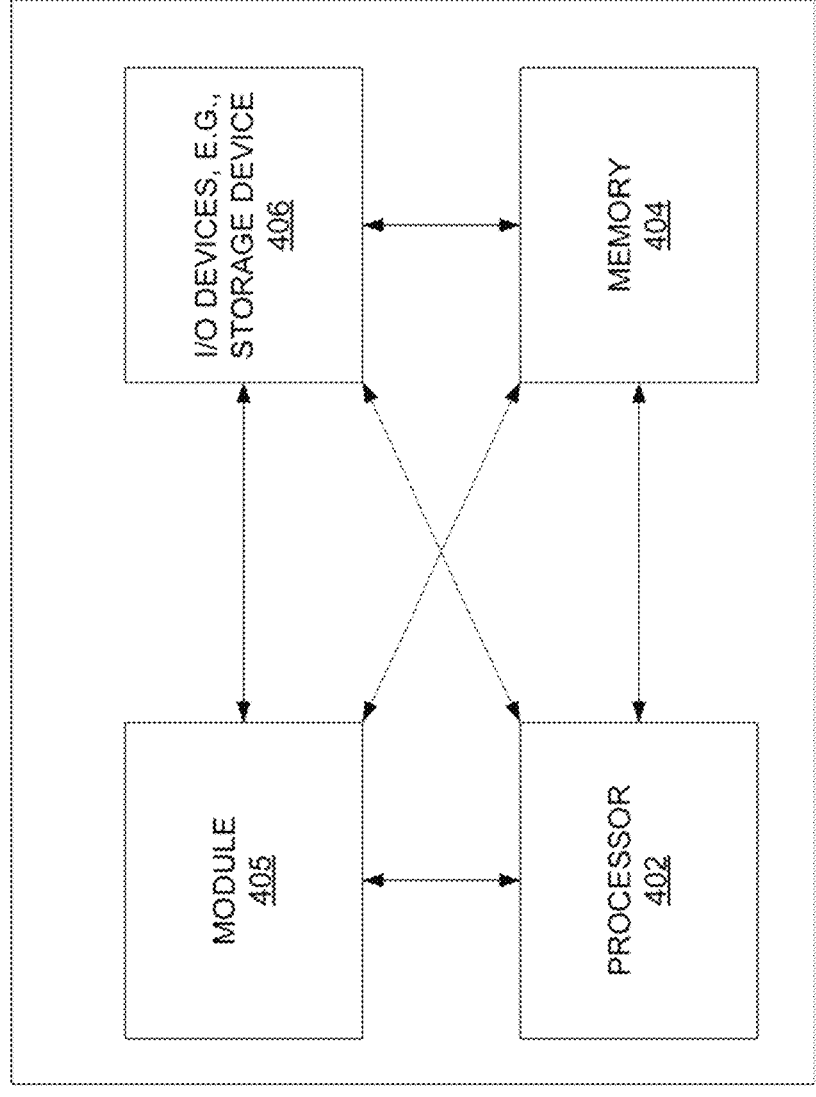
FIG. 4 illustrates a high-level block diagram of a computing device specially programmed to perform the functions described herein.

FIG. 4 depicts a high-level block diagram of a computing system 400 (e.g., a computing device or processing system) specifically programmed to perform the functions described herein. For example, any one or more components, devices, and/or systems illustrated in FIG. 1, or described in connection with FIGS. 2 and 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for generating an alert in response to the identifying one or more embeddings that are within the threshold distance of an embedding of a personal identifier that is generated in accordance with an embedding model, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for generating an alert in response to the identifying one or more embeddings that are within the threshold distance of an embedding of a personal identifier that is generated in accordance with an embedding model (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for generating an alert in response to the identifying one or more embeddings that are within the threshold distance of an embedding of a personal identifier that is generated in accordance with an embedding model (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
obtaining, by a processing system including at least one processor, a personal identifier comprising a plurality of characters associated with a transaction;
generating, by the processing system, a first embedding of the personal identifier in accordance with a text embedding model applied to the plurality of characters, wherein the text embedding model comprises a co-occurrence matrix model, and wherein the generating comprises generating a first co-occurrence matrix in which elements of the co-occurrence matrix comprise measures of co-occurrences of the plurality of characters within sub-strings of the personal identifier;
identifying, by the processing system, one or more embeddings of one or more other personal identifiers that are within a threshold distance of the first embedding, wherein the identifying the one or more embeddings comprises identifying a threshold number of the one or more embeddings of the one or more other personal identifiers that are within the threshold distance, wherein the one or more other personal identifiers are obtained in connection with one or more other transactions, and wherein the one or more personal identifiers include at least one personal identifier that is flagged as being associated with at least one non-permitted transaction; and
generating, by the processing system, an alert in response to the identifying of the one or more embeddings of the one or more other personal identifiers that are within the threshold distance including the at least one personal identifier that is flagged as being associated with at least one non-permitted transaction.

2. The method of claim 1, wherein the text embedding model comprises a character-level embedding model.

3. The method of claim 1, wherein distances of the one or more embeddings of the one or more other personal identifiers are calculated as frobenius distances.

4. The method of claim 1, wherein the first embedding comprises a first vector representation of the personal identifier in a multidimensional space, and wherein the one or more embeddings of the one or more other personal identifiers comprise one or more other vector representations of the one or more other personal identifiers in the multidimensional space.

5. The method of claim 4, wherein distances of the one or more embeddings of the one or more other personal identifiers are calculated as one of:
cosine distances between each of the one or more other vector representations and the first vector representation; or
euclidean distances between each of the one or more other vector representations and the first vector representation.

6. The method of claim 1, wherein the identifying the one or more embeddings comprises:
identifying the one or more embeddings of the one or more other personal identifiers that are associated with a lookback time period.

7. The method of claim 6, wherein the lookback time period is a defined time period prior to the obtaining of the personal identifier.

8. The method of claim 1, wherein the personal identifier and the one or more other personal identifiers comprise submitted names in connection with one or more types of transactions.

9. The method of claim 1, wherein the personal identifier and the one or more other personal identifiers comprise at least one of:
submitted addresses in connection with one or more types of transactions;
submitted usernames in connection with one or more types of transactions;
submitted account identifiers in connection with one or more types of transactions;
submitted account verification keywords in connection with one or more types of transactions; or
submitted governmental issued identification numbers in connection with one or more types of transactions.

10. The method of claim 1, further comprising:
applying features of a match group comprising the personal identifier and the one or more other personal identifiers as inputs to a classifier, wherein an output of the classifier comprises a fraud score associated with the personal identifier.

11. The method of claim 10, wherein the features comprise at least one of:

a number of exact matches between the personal identifier and the one or more other personal identifiers having embeddings within the threshold distance;

a timing between submissions of personal identifiers belonging to the match group;

distances between the first embedding and the one or more embeddings of the one or more other personal identifiers; or distances between the one or more embeddings of the one or more other personal identifiers with each other.

12. The method of claim 10, wherein the classifier comprises at least one of:

a decision tree;

a naïve bayes classifier;

a random forest classifier;

a support vector machine;

a convolutional neural network; or a recurrent neural network.

13. The method of claim 10, wherein the alert is generated further in response to the fraud score.

14. A non-transitory computer-readable medium storing instructions which, when executed by a processing system including at least one processor, cause the processing system to perform operations, the operations comprising:

obtaining a personal identifier comprising a plurality of characters associated with a transaction;

generating a first embedding of the personal identifier in accordance with a text embedding model applied to the plurality of characters, wherein the text embedding model comprises a co-occurrence matrix model, and wherein the generating comprises generating a first co-occurrence matrix in which elements of the co-occurrence matrix comprise measures of co-occurrences of the plurality of characters within sub-strings of the personal identifier;

identifying one or more embeddings of one or more other personal identifiers that are within a threshold distance of the first embedding, wherein the identifying the one or more embeddings comprises identifying a threshold number of the one or more embeddings of the one or more other personal identifiers that are within the threshold distance, wherein the one or more other personal identifiers are obtained in connection with one or more other transactions, and wherein the one or more personal identifiers include at least one personal identifier that is flagged as being associated with at least one non-permitted transaction; and generating an alert in response to the identifying of the one or more embeddings of the one or more other personal identifiers that are within the threshold distance including the at least one personal identifier that is flagged as being associated with at least one non-permitted transaction.

15. A device comprising:

a processing system including at least one processor; and a computer-readable medium storing instructions which, when executed by the processing system, cause the processing system to perform operations, the operations comprising:

obtaining a personal identifier comprising a plurality of characters associated with a transaction;

generating a first embedding of the personal identifier in accordance with a text embedding model applied to the plurality of characters, wherein the text embedding model comprises a co-occurrence matrix model, and wherein the generating comprises generating a first co-occurrence matrix in which elements of the co-occurrence matrix comprise measures of co-occurrences of the plurality of characters within sub-strings of the personal identifier;

identifying one or more embeddings of one or more other personal identifiers that are within a threshold distance of the first embedding, wherein the identifying the one or more embeddings comprises identifying a threshold number of the one or more embeddings of the one or more other personal identifiers that are within the threshold distance, wherein the one or more other personal identifiers are obtained in connection with one or more other transactions, and wherein the one or more personal identifiers include at least one personal identifier that is flagged as being associated with at least one non-permitted transaction; and generating an alert in response to the identifying of the one or more embeddings of the one or more other personal identifiers that are within the threshold distance including the at least one personal identifier that is flagged as being associated with at least one non-permitted transaction.

16. The device of claim 15, wherein the text embedding model comprises a character-level embedding model.

17. The device of claim 15, wherein distances of the one or more embeddings of the one or more other personal identifiers are calculated as frobenius distances.

18. The device of claim 15, wherein the first embedding comprises a first vector representation of the personal identifier in a multidimensional space, and wherein the one or more embeddings of the one or more other personal identifiers comprise one or more other vector representations of the one or more other personal identifiers in the multidimensional space.

19. The device of claim 18, wherein distances of the one or more embeddings of the one or more other personal identifiers are calculated as one of:

cosine distances between each of the one or more other vector representations and the first vector representation; or euclidean distances between each of the one or more other vector representations and the first vector representation.

20. The device of claim 15, wherein the identifying the one or more embeddings comprises:

identifying the one or more embeddings of the one or more other personal identifiers that are associated with a lookback time period.

* * * * *